United States Patent
An et al.

(10) Patent No.: US 10,684,490 B2
(45) Date of Patent: Jun. 16, 2020

(54) SWITCHING PARALLAX BARRIER COMPRISING A GENERATED BLOCKING REGION AND TRANSMITTING REGION AND 3D DISPLAY DEVICE HAVING THE SAME

(71) Applicant: LG DISPLAY CO., LTD., Seoul (KR)

(72) Inventors: ChungHwan An, Seoul (KR); JaeWoo Lee, Paju-si (KR); BoGyun Chung, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 305 days.

(21) Appl. No.: 14/828,010

(22) Filed: Aug. 17, 2015

(65) Prior Publication Data

US 2016/0048029 A1    Feb. 18, 2016

(30) Foreign Application Priority Data

Aug. 18, 2014    (KR) .................. 10-2014-0107180

(51) Int. Cl.
| | |
|---|---|
| *G02B 30/30* | (2020.01) |
| *G02F 1/1335* | (2006.01) |
| *G02B 27/00* | (2006.01) |
| *G02F 1/13* | (2006.01) |
| *G02F 1/1343* | (2006.01) |
| *H04N 13/366* | (2018.01) |
| *H04N 13/31* | (2018.01) |
| *H04N 13/356* | (2018.01) |
| *G02B 30/27* | (2020.01) |
| *G02B 30/26* | (2020.01) |
| *G02B 30/20* | (2020.01) |

(52) U.S. Cl.
CPC ......... *G02B 30/30* (2020.01); *G02B 27/0093* (2013.01); *G02B 30/20* (2020.01); *G02B 30/26* (2020.01); *G02B 30/27* (2020.01); *G02F 1/1323* (2013.01); *G02F 1/133512* (2013.01); *G02F 1/134309* (2013.01); *H04N 13/31* (2018.05); *H04N 13/356* (2018.05); *H04N 13/366* (2018.05)

(58) Field of Classification Search
CPC ....... G02F 1/137; G02B 27/225; G02B 30/20; G02B 30/30; G02B 30/26; H04N 13/0452; G01V 5/0058
See application file for complete search history.

(56) References Cited

U.S. PATENT DOCUMENTS

| | | |
|---|---|---|
| 2004/0227895 A1 | 11/2004 | Yoo et al. |
| 2009/0051835 A1* | 2/2009 | Park .................. G02F 1/133512 349/15 |
| 2011/0228183 A1 | 9/2011 | Hamagishi |

(Continued)

FOREIGN PATENT DOCUMENTS

| | | |
|---|---|---|
| CN | 100445850 C | 12/2008 |
| CN | 102289016 A | 12/2011 |

(Continued)

*Primary Examiner* — Paul C Lee
(74) *Attorney, Agent, or Firm* — Dentons US LLP

(57) ABSTRACT

A three-dimensional (3D) image can be rendered by selectively transmitting a left-eye image and a right-eye image from a display panel in a manner of forming a transmitting electrode and a blocking electrode of the same layer on a switching parallax barrier and selectively applying a voltage to the transmitting electrode and the blocking electrode.

6 Claims, 4 Drawing Sheets

(56) References Cited

U.S. PATENT DOCUMENTS

| | | | |
|---|---|---|---|
| 2011/0304601 A1* | 12/2011 | Niioka | G02B 27/2214 345/209 |
| 2013/0044101 A1* | 2/2013 | Kim | H04N 17/04 345/419 |
| 2013/0053100 A1* | 2/2013 | Song | G09G 3/003 455/556.1 |
| 2013/0057539 A1* | 3/2013 | Kim | G02F 1/134309 345/419 |
| 2013/0100101 A1* | 4/2013 | Li | G02F 1/29 345/211 |
| 2013/0107146 A1* | 5/2013 | Kim | G02F 1/1347 349/15 |
| 2013/0257828 A1 | 10/2013 | Azuma et al. | |

FOREIGN PATENT DOCUMENTS

| | | |
|---|---|---|
| CN | 102540591 A | 7/2012 |
| CN | 102710956 | 10/2012 |
| CN | 103024407 A | 4/2013 |
| CN | 103197474 A | 7/2013 |
| CN | 103207456 A | 7/2013 |
| CN | 103424924 A | 12/2013 |
| CN | 103472651 A | 12/2013 |
| CN | 203337951 U | 12/2013 |
| JP | 2008225177 A | 9/2008 |

* cited by examiner

SWITCHING PARALLAX BARRIER COMPRISING A GENERATED BLOCKING REGION AND TRANSMITTING REGION AND 3D DISPLAY DEVICE HAVING THE SAME

CROSS-REFERENCE TO RELATED APPLICATION

Pursuant to 35 U.S.C. § 119(a), this application claims the benefit of an earlier filing date and right of priority to Korean Application No. 10-2014-0107180, filed on Aug. 18, 2014, the contents of which is incorporated by reference in its entirety for all purposes as if fully set forth herein.

BACKGROUND

Field of the Disclosure

This disclosure relates to a three-dimensional (3D) display device, and more particularly to the 3D display device having a switchable barrier to improve left and right viewing angle characteristics of a 3D image.

Background of the Disclosure

Three-dimensional (3D) display may be briefly described as "all types of systems for artificially generating a 3D screen." Here, a system may include software technologies that can be seen as three-dimensional images and hardware for implementing content made by the software technologies into 3D images. As described above, the 3D system includes a software component because content configured with a particular software scheme is separately required for each stereoscopic implementation process in 3D display hardware.

Furthermore, a virtual 3D display may be defined as all types of systems for allowing a user to virtually perceive depth in planar display hardware using binocular disparity, which results from human eyes being separated from each other by about 65 mm in a horizontal direction, among various factors for allowing a person to sense a three-dimensional effect. In other words, our eyes view slightly different images (strictly speaking, left and right spatial information being slightly physically divided) even when viewing the same object due to the binocular disparity. If these two images are transmitted to the brain through the retinas, then the brain fuses the two images together in a manner to allow an observer to perceive depth. Using this phenomenon, a 3D display device implements virtual depth through a design of displaying both the left and right images at the same time on a two-dimensional display device and projecting them to each eye.

In order to display two channel images on a screen in such virtual 3D display hardware device, in most cases, each channel is output by changing each row in a matrixed display in one direction (horizontal or vertical) on a screen. In this manner, when two channel images are output at the same time on a display device, the right image enters into the right eye and the left image enters into the left eye in case of a no-glasses type from the perspective of hardware configuration. Furthermore, in case of a glasses wearing type, a method is used of hiding the right image not to be seen by the left eye and hiding the left image not to be seen by the right eye, respectively, through suitable glasses.

The most important factor for allowing a person to perceive stereoscopic and depth effects may be binocular disparity due to a distance between two eyes, but also closely related to psychological and memory factors. Therefore, 3D implementation methods are typically divided into a volumetric type, a holographic type, and a stereoscopic type based on the level of three-dimensional image information provided to an observer.

The volumetric type as a method of perceiving a depth direction due to a psychological factor and a suction effect may be applicable to 3D computer graphics in which perspective projection, overlapping, shadow, luminance, movement, and the like are shown based on their calculations. So-called IMAX cinemas in which a large-sized screen having a wide viewing angle is provided to an observer to evoke an optical illusion, such as being sucked into a space.

The holographic type known as the most complete 3D implementation technique may be represented by a laser beam reproduction holography or white light reproduction holography.

Furthermore, the stereoscopic type as a method of perceiving a stereoscopic effect uses a binocular physiological factor with the capacity of generating spatial information prior to and subsequent to a display plane while allowing the brain to combine the images to perceive a stereoscopic image. This can be implemented when associative images of a plane including parallax information are viewed by left and right eyes being separated from each other by about 65 mm as described above, namely, stereography. The stereoscopic type may be largely divided into a glasses-wearing type and a non-glasses-wearing type.

A representative method known as the non-glasses-wearing type may include a lenticular lens mode, in which a lenticular lens sheet on which cylindrical lenses are vertically arranged is provided at a front side of a display panel, and a parallax barrier mode.

Hereinafter, a configuration of a related parallax barrier mode type stereoscopic (or 3D) display device will be described in detail.

FIG. 1 is an exemplary view schematically illustrating a configuration of a parallax barrier type 3D image display device of the related art.

As illustrated in FIG. 1, a related art parallax barrier type 3D image display device includes a display panel 40 to simultaneously output images for left and right eyes (left-eye image and right-eye image), and a parallax barrier 20 at a front surface of the display panel 40.

Here, the display panel 40 includes left-eye pixels L for outputting the left-eye image and right-eye pixels R for outputting the right-eye image in an alternating manner, and the parallax barrier 20 is located between the display panel 40 and a user 30.

The parallax barrier 20 includes barriers 21 and slits 22 between the adjacent barriers 21 so that the left and right-eye images are separated through the parallax barrier 20 while the resultant left and right-eye images are displayed simultaneously.

In this 3D display device, the left-eye image output on left-eye pixels L of the display panel 40 enters into the left eye of a user 30 through the slits 22 of the parallax barrier 20, and the right-eye image output on right-eye pixels R of the display panel 40 enters into the right eye of the user 30 through the slits 22 of the parallax barrier 20. Here, the left and right-eye images contain separate data which take into account human-detectable disparity, and the user 30 recognizes a 3D image by combining the two images.

However, there are some problems with this parallax barrier type 3D display device as follows. This parallax barrier type 3D display device allows the user to view a 3D image without wearing the glasses, but does not allow for adequate switching between 2D and 3D images. Of course, this type of display device can display a 2D image by transmitting through the parallax barrier. However, in this instance, images blocked by the parallax barrier cannot be sensed by the user, which causes the display device to be defective or of poor quality, such as having lowered brightness.

SUMMARY

Therefore, the present invention has recognized the aforementioned problems, and an aspect of the detailed description is to provide a switching parallax barrier, capable of switching between a 2D image and a 3D image, and a display device having the same.

An aspect of the detailed description is to disclose a switching parallax barrier, capable of simplifying a fabricating process and minimizing crosstalk by way of forming a transmitting electrode and a blocking electrode on the same layer and interposing a black matrix therebetween for blocking, and a display device having the same.

To achieve these and other advantages and in accordance with the purpose of this specification, as embodied and broadly described herein, there is provided a parallax barrier of a display device that includes a display panel having pixels for outputting images, the parallax barrier including a first substrate and a second substrate, a common electrode on the second substrate, a liquid crystal layer between the first substrate and the second substrate, an insulating layer on the first substrate, a first electrode and a second electrode on the insulating layer to generate an electric field with the common electrode and orient liquid crystal molecules in the liquid crystal layer to selectively transmit and block images, and a black matrix on the second substrate corresponding to a region between the first electrode and the second electrode to block the images from being transmitted into the region between the first electrode and the second electrode, wherein the first electrode and the second electrode are of a same layer.

In another aspect of the invention a display device comprises a display panel for displaying a left-eye image and a right-eye image; and a parallax barrier having a blocking region and a transmitting region to selectively or entirely transmit the left-eye image and the right-eye image from the display panel, such that two-dimensional and three-dimensional images are separately rendered, the parallax barrier including a plurality of first electrodes and second electrodes respectively on the blocking region and the transmitting region of the same layer, and a black matrix to cover a region between the blocking region and the transmitting region.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, the present invention will be described in detail with reference to the accompanying drawings.

The present embodiment provides a display device on which 2D and 3D images can be viewed. In order to enable showing of 2D and 3D images even on a parallax barrier type 3D display device, the present invention uses a switching parallax barrier which is different from a parallax barrier having separate barriers and slits. The switching parallax barrier enables both 2D and 3D images to be viewable without reducing brightness or causing further image degradation.

Also, the present embodiment improves left and right viewing angle characteristics by switching (moving) a blocking region and a transmitting region of the parallax barrier when the display device is used as a 3D display device. The switching of the blocking region and the transmitting region of the parallax barrier results from a structural characteristic of the parallax barrier. Taking into account this configuration, the switching parallax barrier applied to the present embodiment is not simply converting a 2D image and a 3D image but directed to switching the blocking region and the transmitting region for improving the left and right viewing angle characteristics.

Figure 2:
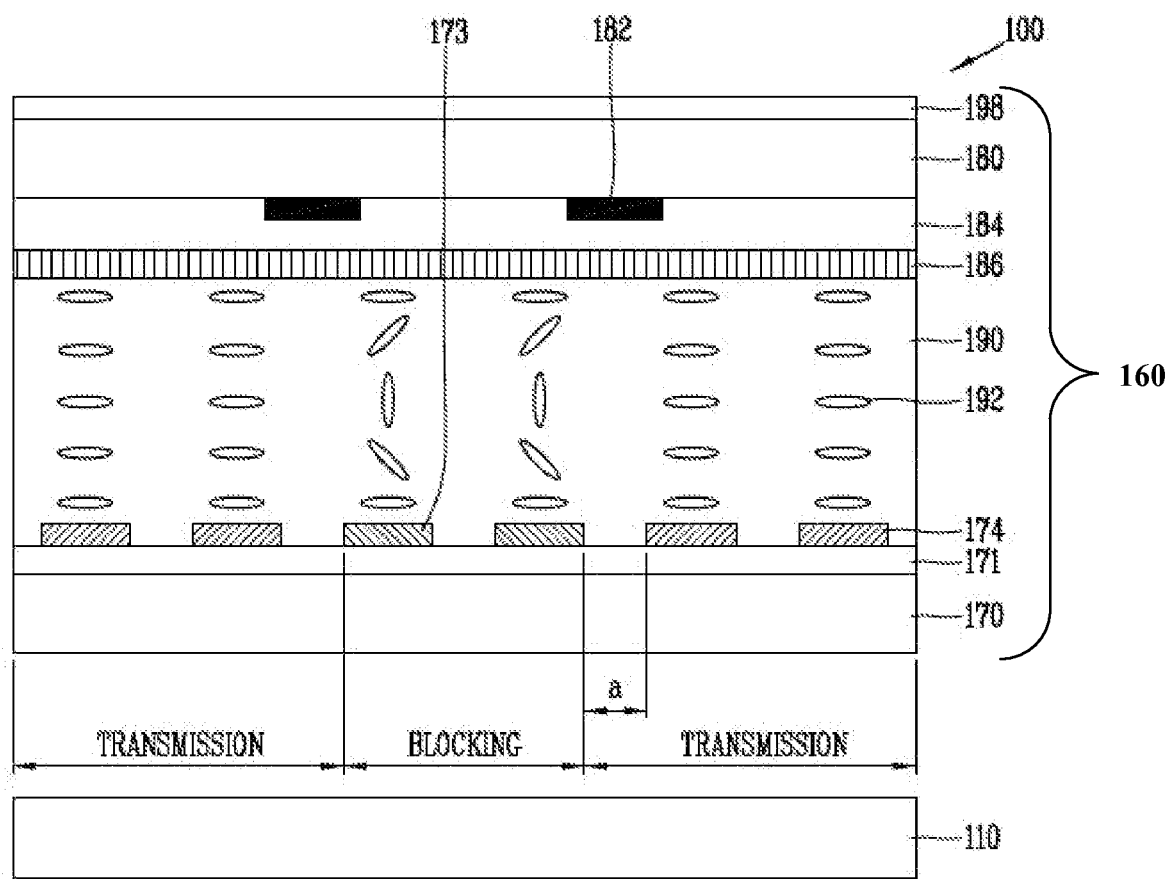
FIG. 2 is a view illustrating a structure of a display device in accordance with an exemplary embodiment.

FIG. 2 is a view illustrating a structure of a 3D display device according to the present embodiment.

As illustrated in FIG. 2, the 3D display device 100 according to the present embodiment includes a display panel 110, and a switching parallax barrier 160 that is on a front surface of the display panel 110 to selectively block and transmit a left-eye image and a right-eye image output on the display panel 110 so as to represent (realize, render, implement) a 2D image and a 3D image in a switching manner.

Although not illustrated in detail, the display panel 110 includes left-eye pixels for outputting left-eye image information and right-eye pixels for outputting right-eye image information in an alternating manner. The display panel 110 is a flat display panel, and may be one of any various types of display panels, such as a liquid crystal panel, an organic light-emitting display panel, and an electrophoretic display panel, etc.

The switching parallax barrier 160 may include a first substrate 170, a second substrate 180, and a liquid crystal layer 190 interposed between the first substrate 170 and the second substrate 180.

An insulating layer 171 may be deposited over the first substrate 170, and a plurality of first electrodes 173 and second electrodes 174 are on the insulating layer 171. The insulating layer 171 may be formed as a single layer or a plurality of layers. When the insulating layer 171 is a single layer, it may be made of an inorganic or organic insulating material. Also, when the insulating layer 171 is formed as a plurality of layers, it may be formed in the form of inorganic insulating layer/organic insulating layer or inorganic insulating layer/inorganic insulating layer.

The first electrode 173 and the second electrode 174 may be formed of a transparent conductive material, such as Indium Tin Oxide (ITO) or Indium Zinc Oxide (IZO). The first electrode 173 and the second electrode 174 may be of the same layer. That is, when the insulating layer 171 is formed as a single layer, both of the first and second electrodes 173 and 174 are formed of the single layer. When the insulating layer 171 is formed as a plurality of layers, the first and second electrodes 173 and 174 are of different layers. When as a single layer, the first and second electrodes 173 and 174 are arranged with predetermined intervals therebetween.

The first electrode 173 and the second electrode 174 are connected to an external driving circuit through connection lines (not illustrated), respectively, so as to receive voltages applied thereto. The voltages applied to the first and second electrodes 173 and 174 may be different from each other.

A black matrix 182 may be inside the second substrate 180, namely, on a surface of the second substrate 180 facing the first substrate 170. The black matrix 182 may be formed of an opaque metallic compound, such as CrO or $CrO_2$, a black resin, or the like. The black matrix 182 may be aligned on regions between the first and second electrodes 173 and 174, to block the first electrode 173 and the second electrode 174 from each other. This will be explained in detail below.

A planarization layer 184 may be on the entire second substrate 180 with the black matrix 182 thereon. A common electrode 186 may be on the polarization layer 184. The common electrode 186 may be formed of a transparent conductive material, such s ITO or IZO, on the entire second substrate 180.

A predetermined gap between the first substrate 170 and the second substrate 180 may be maintained by spacers (not illustrated), and the liquid crystal layer 190 is filled in the gap. Here, although not illustrated, a sealant may be formed along an outer peripheral region of the first and second substrates 170 and 180, such that the first and second substrates 170 and 180 can be bonded to each other, and simultaneously, the liquid crystal layer 190 can be hermetically sealed.

Along with a common voltage being applied to the common electrode 186, driving voltages are applied to the first electrode 173 and the second electrode 174. Accordingly, an electric field can be applied to the liquid crystal layer 190 due to a potential difference between the first electrode 173 and the second electrode 174. Liquid crystal molecules 192 of the liquid crystal layer 190 are thusly arranged according to the electric field.

The voltages applied to the first and second electrodes 173 and 174 may be applied in an active manner or a passive manner. In an active manner, a switching device such as a switching thin-film transistor (TFT) may be employed to actively switch voltages of the first and second electrodes 173 and 174. In a passive manner, connection lines can be simply connected to the first and second electrodes 173 and 174 such that the voltages can be passively applied without switching a TFT to the first and second electrodes 173 and 174.

Although not illustrated, a first alignment layer and a second alignment layer which are aligned by rubbing or the like are on the first substrate 170 and the second substrate 180, such that the liquid crystal molecules 192 of the liquid crystal layer 190 can be arranged along alignment directions of the first and second alignment layers. The alignment directions of the first and second alignment layers may be perpendicular to each other such that the liquid crystal molecules 192 of the liquid crystal layer 190 can be arranged in a 90°-twisted form from the first substrate 170 to the second substrate 180, or may be in parallel to each other such that the liquid crystal molecules 192 can be arranged in the same direction all over the liquid crystal layer 190.

A polarizer 198 may be at an outer surface of the second substrate 180. The polarizer 198 blocks light of certain polarization orientations and transmits incoming light of a perpendicular orientation passed through the liquid crystal layer 190. Here, an optical axis direction of the polarizer 198 depends on the alignment directions of the first and second alignment layers, but is parallel to the alignment directions of the first and second alignment layers in the present embodiment. Therefore, the optical axis direction of the polarizer 198 is parallel to the arrangement direction of the liquid crystal molecules 192.

The parallax barrier 160 of the display device as illustrated performs a similar function as the parallax barrier 20 illustrated in FIG. 1, which will be described in detail hereinafter.

As illustrated in FIG. 2, an electric field is generated (formed) between the first and second electrodes 173 and 174 on the first substrate 170 and the common electrode 186 on the second substrate 180, and applied to the liquid crystal layer 190.

The electric field is generated by relative voltage potentials between the common electrode 186 and the first and second electrodes 173 and 174. When a voltage (referred to as a driving voltage) different from (greater than or smaller than) the common voltage is applied to the first and second electrodes 173 and 174, the electric field is generated. Here, the common voltage may be 0V, or greater or smaller than 0V (±V).

Light transmitting a left-eye image and a right-eye image generated at the display panel 110 is incident onto the switching parallax barrier 160 on the front surface of the display panel 110. When a voltage which is the same as the common voltage is applied to both of the first and second electrodes 173 and 174, an electric field is not generated all over the liquid crystal layer 190, the liquid crystal molecules 192 remain arranged along the alignment directions of the first and second alignment layers.

Therefore, among images incident from the display panel 110, images with electro-optical components having the same optical axis direction as the arrangement direction of the liquid crystal molecules 192 are transmitted through the liquid crystal layer 190. Meanwhile, because the optical axis direction of the polarizer 198 is in parallel to the arrangement direction of the liquid crystal molecules 192, the optical components of the left-eye image and the right-eye image transmitted through the liquid crystal layer 190 are transmitted through the polarizer 198, thereby arriving at the user. In other words, the user receives both of left-eye components and right-eye components at both eyes so as to recognize a 2D image.

When a driving voltage is applied to the first electrode 173 and the same voltage as the common voltage is applied to the second electrode 174, an electric field is applied to the liquid crystal layer 190 which is located at a region corresponding to the first electrode 173 but is not applied to the liquid crystal layer 190 which is located at a region corresponding to the second electrode 174. Therefore, without the electric field, the liquid crystal molecules 192 of the liquid crystal layer 190 at the region corresponding to the second electrode 174 are arranged along the alignment direction of the alignment layer and the liquid crystal molecules 192 of the liquid crystal layer 190 located at the region corresponding to the first electrode 173 are arranged perpendicular to the surface of the first substrate 170 along the electric field, which is generated perpendicular to the first substrate 170.

When the left-eye image and the right-eye image are output on the display panel 110, optical components which are the same as the alignment direction of the alignment layer, of the left-eye image and the right-eye image incident into the second electrode 174 are transmitted through the liquid crystal layer 190 and arrive at the polarizer 198. Because the optical components of the left-eye image and the right-eye image are in parallel to the optical axis direction of the polarizer 198, the optical components of the left-eye image and right-eye image are transmitted through the polarizer 198, thereby reaching the user's left-eye or right-eye.

When the left-eye image and the right-eye image are incident onto the first electrode 173 from the display panel 110, the optical components, which are in parallel to a vertical electric field, of the left-eye image and the right-eye image, are transmitted through the liquid crystal layer 192 so as to arrive at the polarizer 198. However, because the optical axis components of the polarizer 198 are not in parallel to the optical components of the left-eye image and the right-eye image transmitted through the liquid crystal layer 190, the optical components of the left-eye image and the right-eye image are blocked by the polarizer 190, thereby failing to transmit to the user's eyes.

In this manner, in the switching parallax barrier 100, because the first electrode 173 blocks transmission of light as the driving voltage is applied thereto, a region at which the first electrode 173 is located becomes a blocking region. Also, because the same voltage as the common voltage is applied, a region at which the second electrode 173 is located becomes a transmitting region. Therefore, the left-eye image and the right-eye image are selectively transmitted through the transmitting region, thereby rendering a 3D image.

Figure 1:
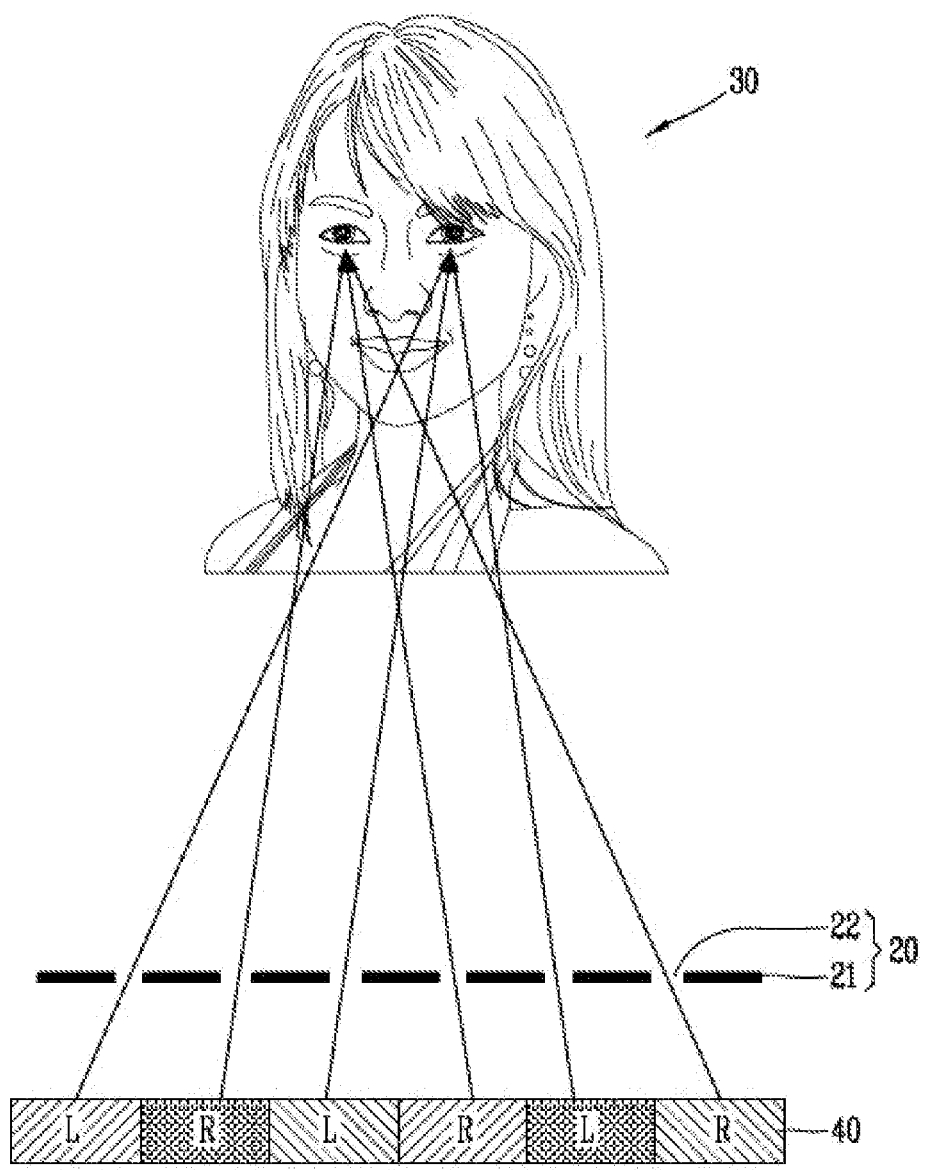
FIG. 1 is a view illustrating a 3D implementing method using a parallax barrier of the related art.

The blocking region (i.e., the region where the first electrode 173 is located) illustrated in FIG. 2 corresponds to the barrier of the related art parallax barrier illustrated in FIG. 1, and the transmitting region (i.e., the region where the second electrode 174 is located) corresponds to the slit of the parallax barrier. Therefore, the left-eye image output from the liquid crystal panel 110 is transmitted through the transmitting region to enter into the user's left eye but the right-eye image is blocked by the blocking region. Also, the right-eye image output from the liquid crystal panel 110 is transmitted through the transmitting region to enter into the user's right eye but the left-eye image is blocked by the blocking region. The user views the left-eye image and the right-eye image to perceive a 3D image.

In this manner, in the present embodiment, a 2D image can be rendered by applying the voltage which is the same as the common voltage to both the first and second electrodes 173 and 174, and the 3D image can be rendered by applying the driving voltage to only the first electrodes 173. This may allow a single display device to be used as both a 2D and 3D display device.

Meanwhile, in the foregoing description, a voltage is applied to the first electrode 173 such that a corresponding region becomes a blocking region, and a voltage is not applied to the second electrode 174 such that the corresponding region becomes a transmitting region. Alternatively, a voltage may be applied to the second electrode 174 such that the corresponding region becomes the blocking region, and a voltage is not applied to the first electrode 173 such that the corresponding region becomes the transmitting region. In other words, the present embodiment can include a feature to selectively drive the first and second electrodes 173 and 174 as the blocking region and the transmitting region according to the user's location, which may result in an increase of left and right viewing angle ranges.

That is, after detecting a user's view position in an eye-tracking manner, a driving voltage may be applied to the first electrode 173 so as to render a 3D image at the corresponding viewing position. When the user moves (for example, when it is impossible for the user to view a 3D image because of moving out of allowable left and right viewing angle ranges), a voltage with the same level as the common voltage may be applied to the first electrode 173 and the driving voltage may be applied to the second electrode 174 to switch the blocking region and the transmitting region. Accordingly, the moved user can still recognize the 3D image.

In this manner, the present embodiment can use a single display device as both of a 2D image display device and a 3D image display device by virtue of the switching parallax barrier, and also remarkably improve the left and right viewing angle characteristics.

Meanwhile, the drawings and the detailed description illustrate that the transmitting region and the blocking region are formed by two electrodes, respectively, but the transmitting region and the blocking region each can be formed by one electrode or three electrodes or more.

The blocking region and the transmitting region correspond to the barrier 21 and the slit 22 of the parallax barrier 20 illustrated in FIG. 1. Therefore, because the blocking region and the transmitting region correspond to the barrier and the slit of the parallax barrier, when the blocking region and the transmitting region each is formed by one electrode, a width of the electrode is the same as the sum of widths of the blocking region and the transmitting region. Also, when the blocking region and the transmitting region each is formed by a plurality of electrodes, the electrodes may be configured such that the sum of widths of the plurality of electrodes can be the same as the widths of the blocking region and the transmitting region.

Meanwhile, as illustrated in FIG. 2, the first electrode 173 and the second electrode 174 are all of the same layer, the reason of which will be described as follows.

Figure 3:
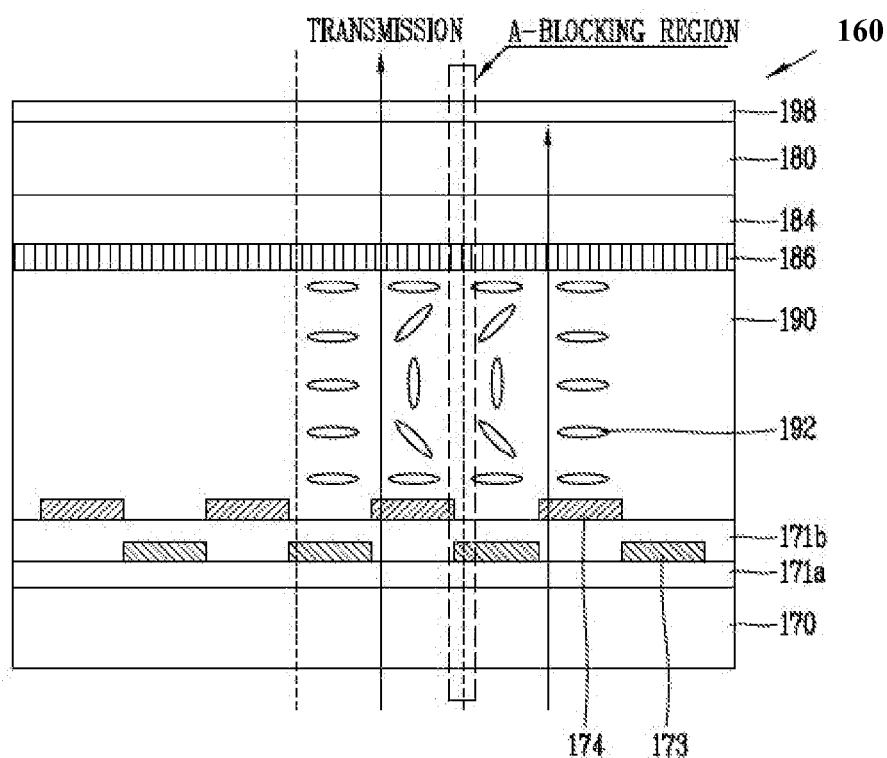
FIG. 3 is a view illustrating an image leakage when a blocking electrode and a transmitting electrode are disposed on different layers.

As illustrated in FIG. 3, the first electrodes 173 and the second electrodes 174 of the parallax barrier may be of different layers. Here, an outer edge of each first electrode 173 on a first insulating layer 171a and an outer edge of each second electrode 174 on a second insulating layer 171b may be aligned with each other to prevent light image transmission between the first electrode 173 and the second electrode 174.

However, this configuration of the parallax barrier 100 may cause the following problem. That is, the first electrode 173 and the second electrode 174 are on the first insulating layer 171a and the second insulating layer 171b, respectively. Here, the outer edges of the first electrode 173 and the second electrode 174 are aligned with each other to prevent light leakage of an image between the first and second electrodes 173 and 174.

A driving voltage is applied to the first electrode 173, and thus, a vertical electric field which is perpendicular to the substrate 170 is generated between the first electrode 173 and the common electrode 186, thereby forming a blocking region. And, a voltage of the same level as the common voltage is applied to the second electrode 174, and thus, an electric field is not generated between the second electrode 174 and the common electrode 186, thereby forming a transmitting region.

However, because the voltages of different levels are applied to the transmitting region and the blocking region, respectively, the electric field is generated due to a potential difference between the second electrode 174 of the transmitting region and the first electrode 173 of the blocking region. This electric field is a horizontal electric field which is substantially parallel to the surfaces of the substrates 170 and 180. Therefore, when a vertical electric field is generated between the first electrode 173 of the blocking region and the common electrode 186, the vertical electric field generated at a region "A" between the transmitting region and the blocking region is distorted due to the horizontal electric field. Accordingly, the liquid crystal molecules 192 at the blocking region are not arranged along the vertical electric field but along the distorted electric field. Also, the liquid crystal molecules 192 at the transmitting region are not arranged along the alignment direction but along the horizontal electric field.

In this manner, the liquid crystal molecules 192 at the region "A" between the transmitting region and the blocking region are arranged neither along the alignment direction of the alignment layer (a transmitting region side of the region "A") nor along the vertical electric field (a blocking region side of the region "A"). Therefore, a left-eye image and a right-eye image output from the display panel are not fully transmitted or blocked causing light leakage at the region "A" between the transmitting region and the blocking region. The light leakage causes a reduction of contrast ratio of a 3D display device and also an increase in crosstalk, a left-eye image enters into a right eye and a right-eye image enters into a left eye during viewing of a 3D image. Also, response speed of the liquid crystal at the area "A" between the transmitting region and the blocking region is lowered due to the distorted electric field. Furthermore, the electrodes are on the two insulating layers 171a and 171b, respectively, which results in a more complicated process and increases fabricating costs.

However, as illustrated in FIG. 2, the present embodiment can solve the problems by forming the first and second electrodes 173 and 174 on the same layer with a predetermined spaced interval (or gap) a therebetween. Here, the spaced interval "a" is provided to minimize the distortion of the electric field between the transmitting region and the blocking region due to the potential difference between the first electrode 173 and the second electrode 174, when forming the transmitting region and the blocking region in response to the voltages of different levels applied to the first and second electrodes 173 and 174. Therefore, the spaced distance "a" may be set according to levels of voltages applied to the first electrode 173, the second electrode 174 and the common electrode 186, a type of liquid crystal molecule, width and materials of the first electrode 173 and the second electrode 174, and the like, thereby minimizing the electric field distortion between the transmitting region and the blocking region.

The black matrix 182 is on the second substrate 180, to block the transmission of the left-eye image and the right-eye image into the interval "a" between the first electrode 173 and the second electrode 174. The black matrix 182 can also prevent the light leakage due to the electric field distortion which may be caused between the first electrode 173 and the second electrode 174.

Figure 4:
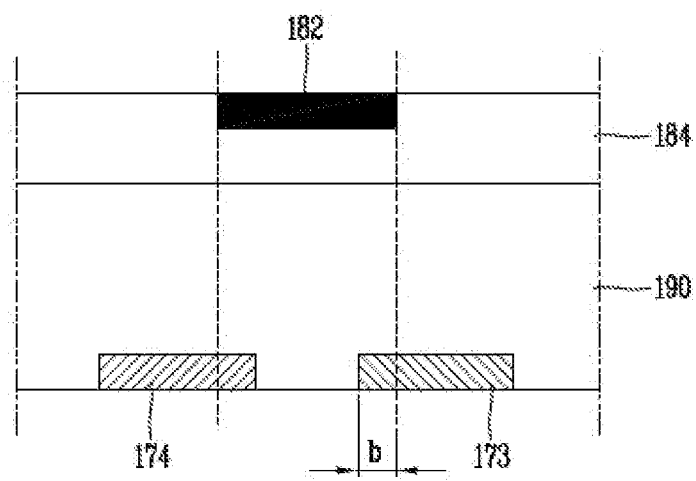
FIG. 4 is a view schematically illustrating a structure of electrodes and a black matrix in accordance with the embodiment.

As illustrated in FIG. 4, considering an assembly tolerance between the first substrate 170 and the second substrate 180 of the parallax barrier 160, a formation tolerance of the first and second electrodes 173 and 174 and a formation tolerance of the black matrix 182, the black matrix 182 is preferably formed to be wide enough to fully cover the interval "a" between the first and second electrodes 173 and 174 and cover partial regions "b" of the first and second electrodes 173 and 174.

Meanwhile, the drawing illustrates that the black matrix 182 is on the second substrate 180, but the black matrix 182 may also be on the first substrate 180.

In this manner, since the first electrode 173 and the second electrode 174 are of the same layer, they can be formed by a one-time fabricating process, which may result in a simplification of the fabrication process and a reduction of fabricating costs. Also, because the first electrode 173 and the second electrode 174 are spaced by the predetermined interval, when different voltages are applied to the first electrode 173 and the second electrode 174, the electric field may not be distorted at the region between the first and second electrodes 173 and 174, and thus, light leakage into the region can be prevented. This may result in preventing a reduction of contrast ratio and an increase in the crosstalk.

The black matrix 182 may be among all of the first and second electrodes 173 and 174. However, if the first electrode 173 at one blocking region and the second electrode 174 at one transmitting region is provided in plurality, respectively, the plurality of electrodes may form one blocking region and one transmitting region, respectively. The same voltage is applied to each of the plurality of first electrodes 173 and second electrodes 174, which are arranged on the one blocking region and the one transmitting region, respectively. Therefore, because the same potential is formed among the plurality of electrodes arranged on each of the one blocking region and the one transmitting region, the electric field distortion is not created.

Consequently, when each of the first electrode 173 at one blocking region and the second electrode 174 at one transmitting region is provided in plurality, the black matrix is only between electrodes which form a boundary between the transmission and the blocking region, without being formed between the electrodes arranged within the transmitting region and the blocking region.

Meanwhile, in the present embodiment, because the black matrix 182 is on the second substrate 180, the aperture ratio may be lowered. Hence, in order to prevent the aperture ratio from being lowered in the present embodiment, the first electrodes 173, the second electrodes 174 and the black matrix 182 may be formed in an optimized manner, which will be explained in more detail below.

Figure 5:
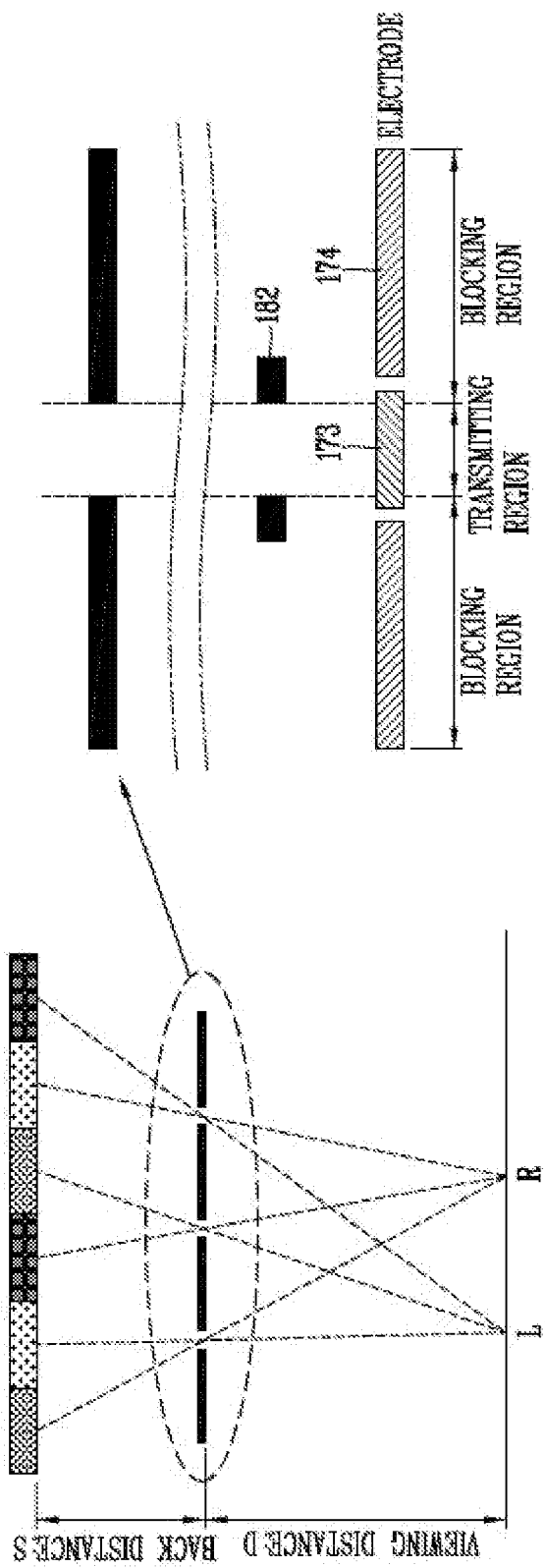
FIG. 5 is a view illustrating comparison results of a structure of electrodes and a black matrix according to the embodiment and a related art parallax barrier.

FIG. 5 is a view illustrating comparison results of a structure of electrodes and a black matrix according to the present embodiment and a related parallax barrier.

Here, the drawing on the left illustrates the related art parallax barrier with the barriers and the slits, and the drawing on the right illustrates an expanded view of the structure of the switching parallax barrier with the electrodes 173 and 174 and the black matrix 182.

For the related art parallax barrier, an area of the transmitting region is about 20 to 30% of an entire area. In the present embodiment, in order to maintain the same transmission as the related art parallax barrier, the black matrix 182 may be at an upper end or lower end of the blocking first electrode 173 in a manner that the sum of a width of the blocking region and a width of a region blocked by the black matrix can be the same as a width of the related art barrier. That is, after the second electrode 174 for transmission is formed to have a width greater than the width of the transmitting region, the black matrix 182 is formed at left and right sides of the transmitting region in a manner that a width between two adjacent black matrix portions 182 is the same as the width of the slit of the related art parallax barrier.

In this manner, although the black matrix is between the second electrode 174 for transmission and the first electrode 173 for blocking in the present embodiment, because the width of the transmitting region can be the same as the width of the slit of the related art parallax barrier, a lower aperture ratio due to the black matrix can be prevented.

As aforementioned, the present embodiment can simplify a fabricating process and simultaneously prevent crosstalk due to a distorted electric field by way of forming both of a transmitting electrode and a blocking electrode of a switching parallax barrier on the same layer. Also, a black matrix may be between the transmitting electrode and the blocking electrode to prevent light leakage of images between the transmitting electrode and the blocking electrode.

Meanwhile, the foregoing description has been given of a switching parallax barrier in a specific structure, and a display device having the same, but the present embodiment may not be limited to them. That is, the present embodiment may also be applied to various structures of parallax barriers and display devices having the same, if a transmitting electrode and a blocking electrode are at the same layer and a black matrix is between the transmitting electrode and the blocking electrode.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display device comprising a display panel having pixels for outputting images and a parallax barrier, the parallax barrier comprising:
   a first substrate and a second substrate;
   a common electrode on the second substrate;
   a liquid crystal layer between the first substrate and the second substrate;
   an insulating layer on the first substrate;
   a plurality of first electrodes and a plurality of second electrodes on the insulating layer to generate an electric field with the common electrode and orient liquid crystal molecules in the liquid crystal layer to selectively transmit and block images; and
   a black matrix on the second substrate,
   wherein the plurality of first electrodes and the plurality of second electrodes are of a same layer,
   wherein a first voltage is applied to the plurality of first electrodes and a second voltage is applied to the plurality of second electrodes, based on a user's view position, to generate one blocking region and one transmitting region
   wherein a three-dimensional (3D) image is generated when the first voltage is different from the second voltage, and a two-dimensional (2D) image is generated when the first voltage is same as the second voltage,
   wherein the user's view position is detected by tracking the user's eyes,
   wherein the black matrix covers a region between electrodes which form a boundary between one blocking region and the one transmitting region, and partially covers the first and second electrodes at the boundary,
   wherein the one blocking region and the one transmitting region are alternately arranged,
   wherein at least two first electrodes among the plurality of first electrodes are arranged within the one blocking region, and wherein at least two second electrodes among the plurality of second electrodes are arranged within the one transmitting region, such that the one blocking region comprising the at least two first electrodes does not include a transmitting region, and the one transmitting region comprising the at least two second electrodes does not include a blocking region.

2. The display device of claim 1, further comprising:
   a first alignment layer and a second alignment layer, respectively, on the first substrate and the second substrate, each of the first alignment layer and the second alignment layer having an alignment direction; and
   a polarizer on an upper surface of the second substrate, an optical axis direction of the polarizer being parallel to the alignment directions of the first alignment layer and the second alignment layer, thereby the left-eye and right-eye images are transmitted without an electric field applied thereto.

3. The display device of claim 1 of claim 1, wherein the images comprise a left-eye image and a right-eye image to generate the three-dimensional (3D) image.

4. The display device of claim 1, wherein the display panel is one of a liquid crystal panel, an electrophoretic display panel, and an organic light-emitting display panel.

5. The display device of claim 1, wherein a width of the transmitting region is a sum of a width of the one blocking region and a width of the black matrix covering the region between the electrodes forming the boundary between the one blocking region and the one transmitting region.

6. The display device of claim 1, wherein voltages applied to the first electrode and the second electrode, respectively, are varied by movement of the user.

* * * * *